No. 674,233. Patented May 14, 1901.
J. B. CARTER.
CHECK ROW CORN PLANTER.
(Application filed Feb. 13, 1901.)
(No Model.) 2 Sheets—Sheet 1.

Jesse B. Carter, Inventor,

Witnesses

No. 674,233.  
J. B. CARTER.  
CHECK ROW CORN PLANTER.  
(Application filed Feb. 13, 1901.)

Patented May 14, 1901.

(No Model.)

2 Sheets—Sheet 2.

UNITED STATES PATENT OFFICE.

JESSE B. CARTER, OF BLUFFS, ILLINOIS.

CHECK-ROW CORN-PLANTER.

SPECIFICATION forming part of Letters Patent No. 674,233, dated May 14, 1901.

Application filed February 13, 1901. Serial No. 47,151. (No model.)

*To all whom it may concern:*

Be it known that I, JESSE B. CARTER, a citizen of the United States, residing at Bluffs, in the county of Scott and State of Illinois, have invented certain new and useful Improvements in Check-Row Corn-Planters; and I do hereby declare the following to be a full, clear, and exact description of the invention, such as will enable others skilled in the art to which it appertains to make and use the same.

This invention relates to improvements in check-row corn-planters employing a wire carrying buttons which are caused to severally engage with a fork to actuate devices carried upon the planter for dropping corn at regular intervals.

The invention also relates to means for feeding corn from the hoppers to the heels of the runners.

The principal novelty of the invention lies in the idea of carrying the wire upon a reel on the planter and in securing the free end to an anchor at one side of the field, so that the wire will be unwound on one row and rewound upon the return, thus obviating the necessity of stretching the wire between two anchors. The winding up of the wire is accomplished by automatic means.

In order to better understand the nature of this invention, attention is called to the accompanying drawings, in which—

Figure 1:
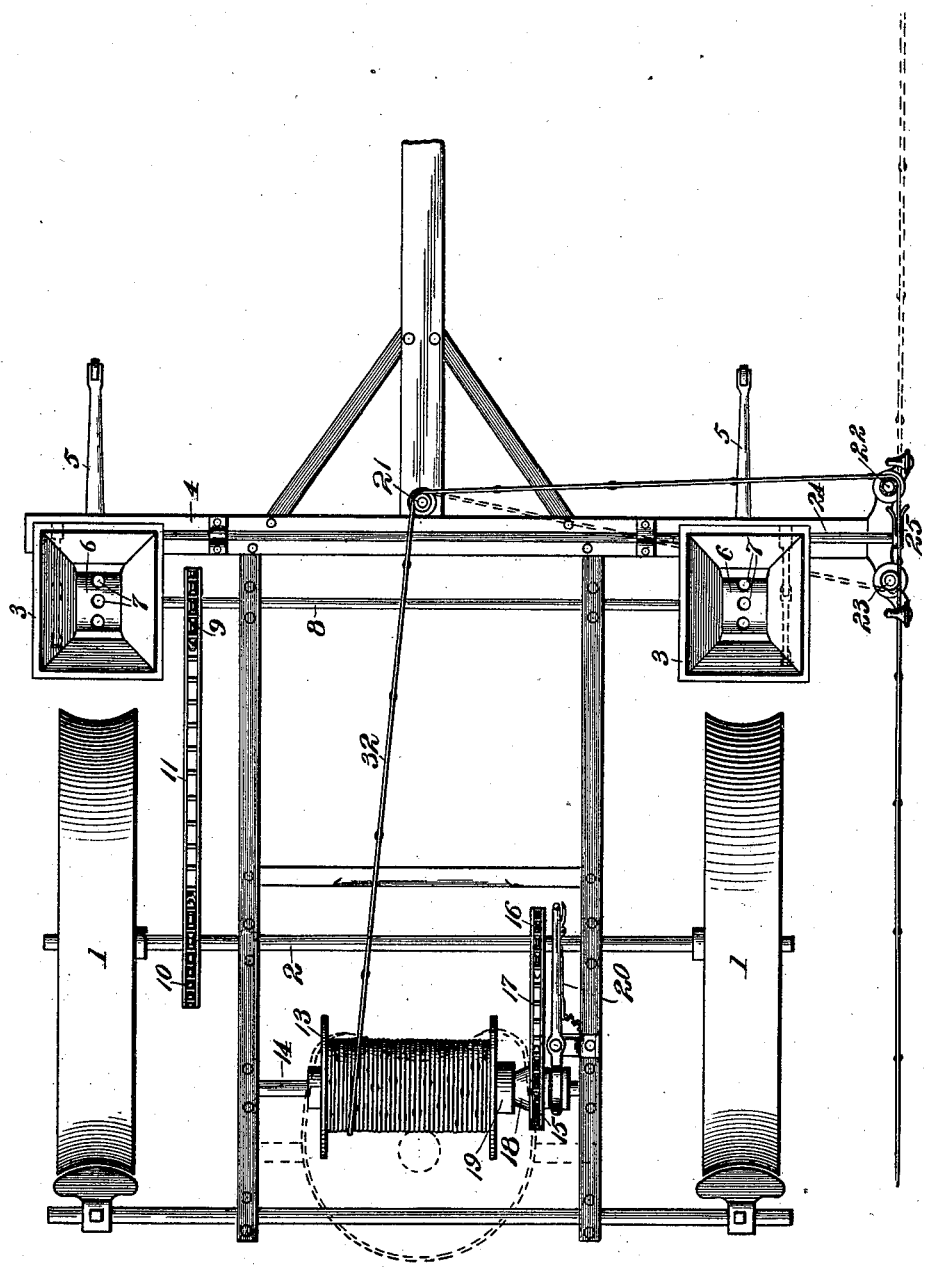
Figure 2:
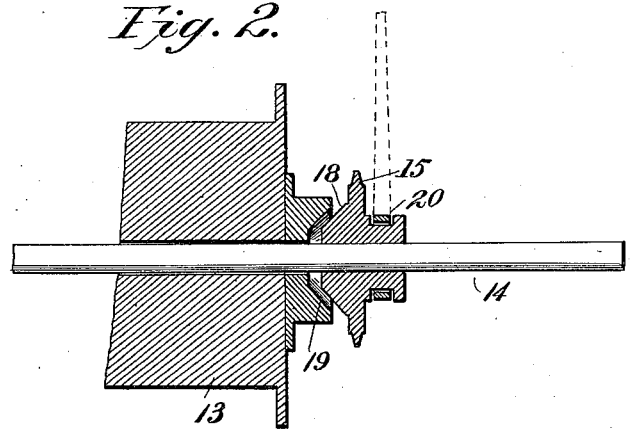
Figure 3:
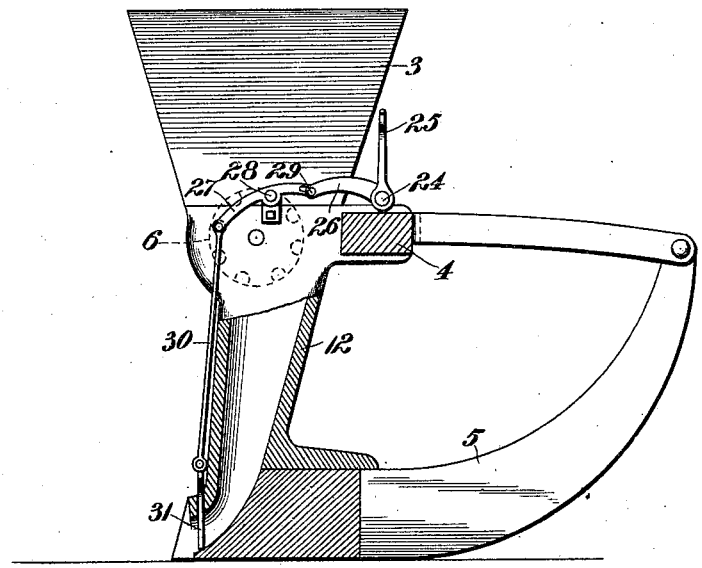

Figure 1 is a top view of the planter. Fig. 2 is a horizontal sectional view of the clutch and part of the reel; and Fig. 3 is an enlarged side view, partly in section, of one of the runners and the dropping mechanism.

In all views like parts are designated by the same figures of reference.

Referring to Fig. 1, the frame, of the usual form, is supported upon two wheels 1 1, one of which is keyed to and rotates the supporting-axle 2. If desired, both wheels may be connected to the axle by ratchet-clutches, as is well known in the art. The corn-hoppers 3 3 are supported upon the cross-beam 4 immediately over the runners 5 5. Corn is fed to the runners from the hoppers in regular and determined quantities by means of the following device: At the lower part of each hopper is a flat-faced wheel 6, (shown in Fig. 3 in broken lines,) completely closing the bottom thereof. Each wheel is provided upon its periphery with a series of pockets 7 7. The wheels are steadily rotated and feed the corn regularly into the leg 12 of the runners. For rotating the wheels their supporting-shaft 8 is provided with a sprocket-wheel 9, which is connected to and is rotated by a sprocket 10 on the axle 2 by means of a chain 11. The parts are so proportioned as to drive the shaft 8 and wheels 6 at the proper rate of speed.

The check-row device consists of the reel 13, mounted behind the supporting-axle 2 on a shaft 14. The reel is rotated by means of a sprocket 15, axle-sprocket 16, and chain 17, as shown. The sprocket 15 is connected to rotate the reel by means of the clutch shown in Fig. 2. This clutch consists of the sliding cone 18, which may be made to engage with the cone 19 by means of the hand-lever 20. The cone 19 is connected to and rotates with the reel 13. The two cone parts are so engaged as to allow of some slip.

The wire 32 passes from the reel to the anchor by being led around the guide-pulley 21 in the front part of the frame to either of the side pulleys 22 or 23, as may depend upon the direction of travel.

The dropping mechanism consists of the transverse shaft 24, supported upon the beam 4 and carrying the fork 25. The shaft 24 has adjacent to each hopper a fixed lever 26, (shown in Fig. 3,) which engages with the lever 27. The latter is pivoted at 28 to the edge of the leg 12 or the beam 4, whichever may be the more convenient. The levers 26 and 27 engage at 29. The rods 30 and gate 31 are controlled by the movement of the lever 27, as will be evident.

The operation of the entire device is as follows: In starting the wire 32 is paid out from the reel 13 around the pulleys 21 and 22 to the anchor. As the planter advances the wire will be unwound from the reel. The buttons on the wire will engage at proper intervals with the fork 25. This action will rock the shaft 24, depress the levers 26 and 27, and elevate the rod 30 and gate 31, dropping the corn. The latter will be fed in proper quantities into the leg 12 by the disk 6, as before described. Upon reaching the end of the field the planter will be reversed and the bight of the wire will be transferred to the position shown in broken lines in Fig. 1 around the pulley 23. The wire will still engage with the fork 25. The clutch-pieces 18 and 19 will be engaged by the operator, and as the planter advances the reel will be rotated, winding up the wire as fast as necessary. The parts are so proportioned as to rotate the reel faster than is normally necessary, so as always to stretch the wire under sufficient tension to neutralize any inequalities in the ground. The slipping of the parts of the clutch will allow of this.

Having now described my invention, what I claim as new therein, and desire to secure by Letters Patent, is—

In a check-row corn-planter the combination with the wheels and frame therefor of the corn-hoppers, the corn-reservoirs below the same, the rotating feeding devices therefor, positive connections between the wheels and the feeding devices, a wire-reel, a driving-chain, connecting said reel and the driving-wheels, a positively-actuated friction-clutch interposed between the driving-wheels and the reel, means for engaging and disengaging the clutch, a wire carried by the reel, guiding-pulleys upon the frame to grasp the bight of the wire, a tripping-finger in the path of said wire, a tripping-gate at the exit of each grain-reservoir and levers connecting the tripping-fingers with the dropping-gates substantially as described.

This specification signed and witnessed this 1st day of February, 1901.

JESSE B CARTER.

Witnesses:
CHAS. E. THOMPSON,
F. C. FUNK.